(12) United States Patent
Bridgelall

(10) Patent No.: US 7,668,754 B1
(45) Date of Patent: Feb. 23, 2010

(54) ARCHITECTURE FOR SECURE REVERSE MOBILE COMMERCE

(75) Inventor: Raj Bridgelall, Mount Sinai, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 787 days.

(21) Appl. No.: 10/624,170

(22) Filed: Jul. 21, 2003

(51) Int. Cl.
*G06Q 30/00* (2006.01)

(52) U.S. Cl. .......................... 705/26; 705/37

(58) Field of Classification Search ............. 705/26, 705/37
See application file for complete search history.

(56) References Cited

U.S. PATENT DOCUMENTS

| | | | |
|---|---|---|---|
| 6,791,472 B1 * | 9/2004 | Hoffberg | 340/905 |
| 2002/0035536 A1 * | 3/2002 | Gellman | 705/37 |
| 2002/0113707 A1 * | 8/2002 | Grunes et al. | 340/572.1 |
| 2003/0187787 A1 * | 10/2003 | Freund | 705/39 |
| 2004/0034771 A1 * | 2/2004 | Edgett et al. | 713/168 |
| 2004/0204063 A1 * | 10/2004 | Van Erlach | 455/556.1 |

OTHER PUBLICATIONS

Cellenium Launches Bluetooth M-Commerce Application Based on Texas Instruments Bluetooth Technology, Business & High-Tech Editors Bluetooth Congress Amsterdam, Netherlands Jun. 12-14, 2002 Booth #313. Business Wire. New York: Jun. 12, 2002, downloaded from ProQuest Direct on the Internet on Jul. 5, 2007, 3 pages.*
Bridgelall. "Enabling Mobile Commerce Through Pervasive Communications with Ubiquitous RF Tags" (2003) Proceedings of the IEEE Wireless Communications and Networking Conference, New Orleans, pp. 2041-2046.
PPT 8800 Series with Windows Mobile 2003 Software for Pocket PC's http://www.symbol.com/products/mobile computers/mobile ppr8800 ppc2003.html last viewed Jun. 23, 2003, 4 pages.

* cited by examiner

*Primary Examiner*—James Zurita

(57) ABSTRACT

A secure m-commerce system and device. A consumer m-commerce device receives product data via a number of data input techniques. The product data is uploaded to a remote personal agent that requests bids from commercial partners to transact the list. When a bid is selected, the consumer transacts remotely to complete the purchase thereof. The system tracks geographically the device such that the consumer is alerted to a partner location, and may stop by the location for further information. The device may also output a store map to the consumer that locates all products on the shopping list.

40 Claims, 9 Drawing Sheets

ARCHITECTURE FOR SECURE REVERSE MOBILE COMMERCE

TECHNICAL FIELD

This invention relates to e-commerce architectures, and more specifically to m-commerce devices for transacting purchases.

BACKGROUND OF THE INVENTION

Mobile commerce is becoming a more widely available technology for facilitating wireless purchases, a technology that significantly enhances the shopping experience and availability of product/service information. Nowadays, consumers seem to be involved in an increasingly demanding living and working environment of having less time in which to accomplish more. Thus, mobile commerce (also called "m-commerce") offers a way of reducing the time required to shop for products and services through wireless technology. The potential savings to all participants in time, equipment, and resources in such architecture are enormous. Networks can be accessed, product and service information searched, and those products/services purchased all from a small portable terminal.

However, m-commerce does not yet have a universally accepted definition. To many users, it simply means the capability to purchase goods and services online without being physically tethered to a network. This definition is occasionally extended to include food and gas purchases made with radio frequency identification devices such as a Mobil-Exxon Speedpass™ and EZ-Pass™ systems. Personal shopping systems in supermarkets and department stores are also often included in this definition. Additionally, some mobile telephone providers have been promoting their version of m-commerce whereby consumers may charge items to their mobile phone accounts by keying in the UPC codes for items that they purchase.

One of the greatest impediments to a successful large-scale deployment of m-commerce systems is security. The consumer needs to feel comfortable and secure in the transmission of personal and financial information over network architectures. The vendor subscribers and all of the associated third-party participants, e.g., banks and credit card companies, also need to feel secure in providing access to their services and systems.

Additionally, other aspects associated with shopping need to be addressed to further streamline the shopping process. For example, even with existing m-commerce systems, the consumer may not find all of the products online. Moreover, even if the products are all available online, the products may not be local so that the shipping costs involved may be significant enough to cause the consumer to fall back to traditional methods of calling and/or driving around locally to find the products, all which increase the cost of the shopping experience.

What is needed is an m-commerce purchasing architecture that significantly enhances the shopping experience by providing a wireless regime over which to significantly reduce the time and cost associated with shopping and a secure communication environment over which to facilitate the purchase.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention disclosed and claimed herein, in one aspect thereof, comprises a global framework for mobile commerce that provides data input to receive purchase information, location aware transactions, real-time bidding for items on a personal shopping list, and seamless connectivity with an on-line agent while maintaining privacy in the commerce transaction. The personal self-shopping system provides: high accuracy location for specific items in a store; discrete EAS functionality that is bi-stable, resettable, and secure; privacy of purchases without compromising the capability to process returns or recalls; and secure payment incorporating personal (biometric) authentication.

In another aspect of the invention, an "always-connected" portable terminal device is provided suitable for operation according to the disclosed framework. A consumer using the "always-connected" m-commerce device (e.g., a connected personal data assistant (cPDA)) enters item data thereinto to create the shopping list, which device has access to several types of networks. The shopping list is transmitted to a remote personal agent (RPA), which RPA then transmits the list in real-time to several commercial partners (or commercial subscribers) of the architecture. One or more of the partners respond back with bids for transacting all or part of the shopping list. The consumer then selects a bid, and completes the transaction.

In another aspect thereof, the cPDA is tracked by a global tracking system such that when the list stored in the cPDA is exposed to partners, the partners may detect the location of the cPDA (and consumer) to signal the consumer that the partner is nearby and can provide the item(s).

In still another aspect thereof, when the consumer is shopping in a store, the cPDA location can be detected and caused to output an item location map such that the consumer can go straight to the items on the shopping list. The consumer no longer needs to request assistance or read signs to find an item for purchase. This may be facilitated by the cPDA automatically connecting to the store database to extract item location information in the form of aisle numbers and location data within the aisle.

In yet another aspect of the invention, the cPDA device is operable to download shopping data from smart appliances, which may be in the consumer's home or elsewhere. The shopping data is added to the shopping list, which list is used later for receiving bids.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
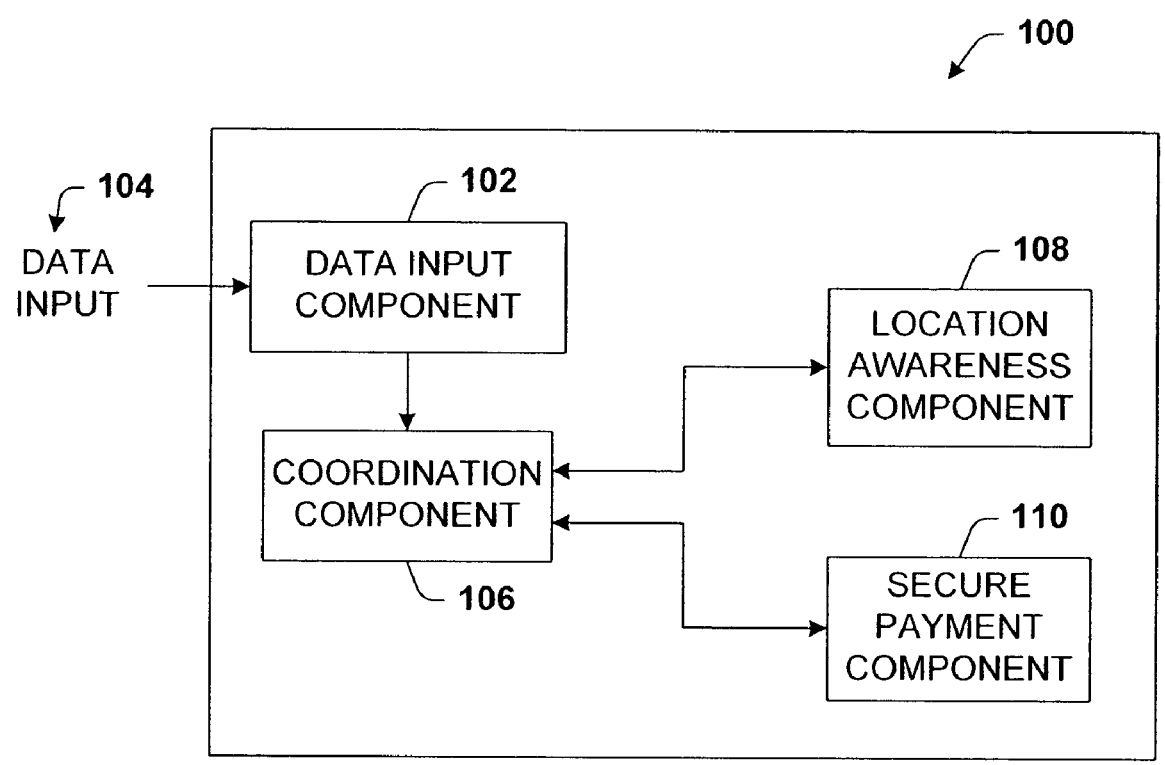
FIG. 1 illustrates a block diagram of a system of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to FIG. 1, there is illustrated a block diagram of a system 100 of the present invention. The system 100 utilizes automatic data capture, real-time location tracking within both wide and local area networks, "always-on" wireless network connectivity, radio frequency identification-electronic article surveillance (RFID-EAS), biometric authentication, and secure payment subsystems. A basic RFID system consists of three components: an antenna or coil, a transceiver (with decoder), and a transponder (RF tag) electronically programmed with unique information. The antenna emits radio signals to activate the tag and read and write data to it. Antennas are the conduits between the tag and the transceiver, which controls the system's data acquisition and communication, and are available in a variety of shapes and sizes; they can be built into a door frame to receive tag data from persons or things passing through the door, or mounted on an interstate toll booth to monitor traffic passing by on a freeway. The electromagnetic field produced by an antenna can be constantly present when multiple tags are expected continually. If constant interrogation is not required, a sensor device can activate the field. Often the antenna is packaged with the transceiver and decoder to become a reader, which can be configured either as a handheld or a fixed-mount device. The reader emits radio waves in ranges of anywhere from one inch to one hundred feet or more, depending upon its power output and the radio frequency used. When an RFID tag passes through the electromagnetic zone, it detects the reader's activation signal. The reader decodes the data encoded in the tag's integrated circuit (silicon chip) and the data is passed to the host computer for processing.

The EAS digital system is designed to help retailers increase sales and profits by attaching a tag to each article of commerce to reduce shoplifting and increase open merchandising opportunities. When an EAS bit in the tag is set, the EAS tag triggers an alarm at the exit gate of the store. When scanning the tag, the barcode scanner disables the EAS bit prohibiting activation of the gate alarm.

In furtherance thereof, the system 100 includes a data input component 102 (also denoted hereinafter as a portable terminal device) for receiving data input 104, the capability allowing a customer to facilitate data entry of an article of commerce (i.e., products and/or services) for the purpose of purchase and/or informational interests. The method of data entry includes manual entry, scanning of datafonms and/or image capture. Once entered into the system 100, the data is transmitted to a central coordination component 106 that coordinates a number of system capabilities. More specifically, and as is described in detail hereinbelow, this includes receiving the input data 104 (e.g., article-of-commerce information) from the data input component 102, transmitting the article-of-commerce information to one or more vendors to receive bids for the existing shopping list, facilitating location awareness and secure payment.

The mode of transmission may be via a wired or wireless regime, which wireless regime is preferred in that the system 100 typically accommodates a wireless mobile device. This communication capability comprises many types of conventional communication technologies, e.g., RF, infrared, and any IEEE 802.11 wireless technology (e.g., Bluetooth). Conventional wired communication technologies available for use are well known in the art. Where the device uses cellular communication links, other types of satellite-based location tracking systems may be used (e.g., GSM (Global System for Mobile Communications) for digital cellular devices and GPS (Global Positioning System)), as well as non-satellite-based systems that may be more conducive for in-store use. This also includes CDPD (Cellular Digital Packet Data) capability and other related technology for sending digital packet data via the analog and digital cellular networks.

The system 100 includes a location-awareness component 108 such that the location of the user may be known at all times, where the data input component 102 that the user is using includes location-tracking technology. Thus as the customer approaches the proximity of a store, for example, that subscribes to the disclosed architecture, the store and/or the customer may be made aware of this fact that both are in close proximity to one another. The coordination component 106 provides location data of the user to the commercial partner and the location of the commercial partner to the user.

The system 100 provides for a secure payment process while operating during an in-store shopping via a secure payment component 110. The secure payment component 110 encodes the signals transmitted between the data input component, the article-of-commerce to be purchased, and a store backoffice system.

In one aspect thereof, the disclosed architecture is a reverse commerce system that matches one or more items on a personal shopping list with a vendor willing to meet the price range and delivery terms for those specific items. The system will additionally alert the consumer when they are within physical proximity of a vendor who wins the bid for specific items. For example, the proposed system will alert a consumer who is within a few minutes of a dealer willing to sell the specific car matching the parameters previously requested. These parameters may include specific options and a price range.

Figure 2:
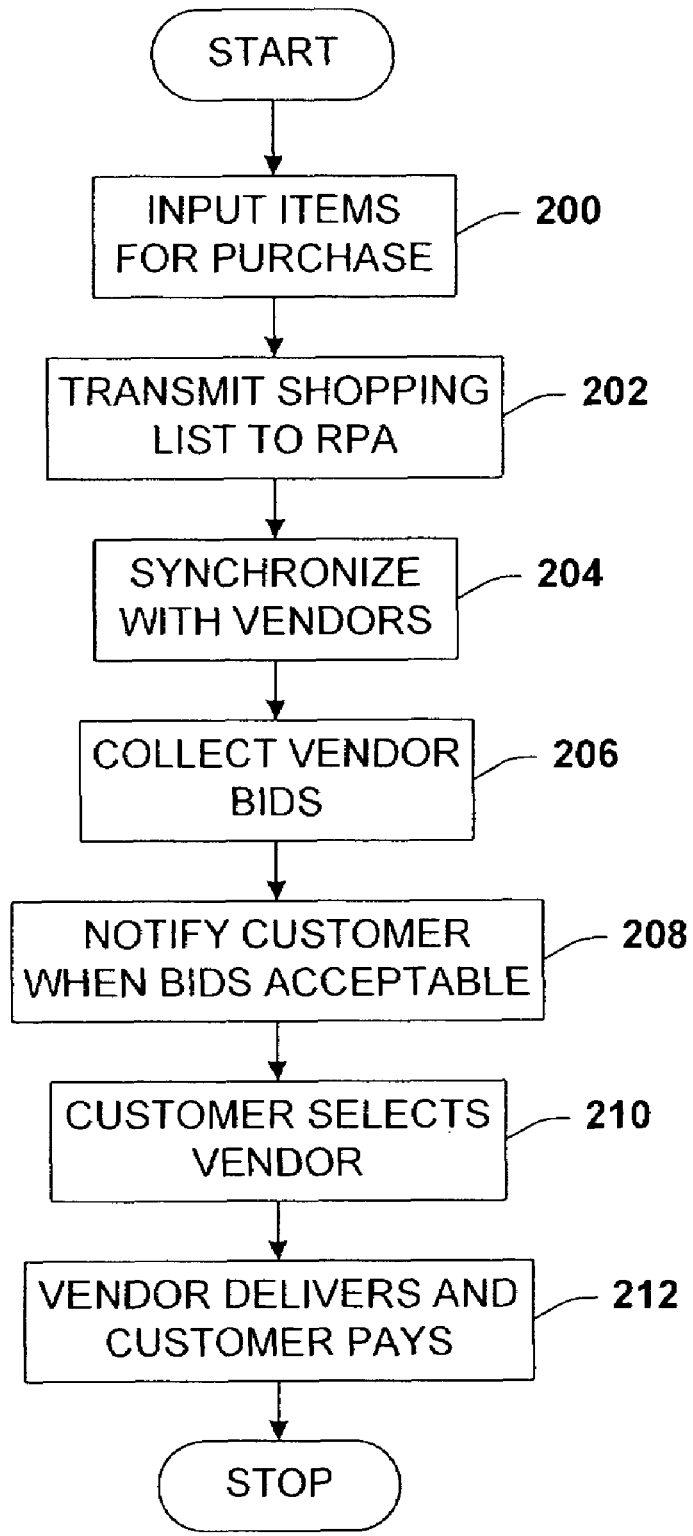
FIG. 2 illustrates a flow chart of the reverse commerce bid process of the present invention.

Referring now to FIG. 2, there is illustrated a flow chart of the reverse commerce bid process of the present invention. While, for purposes of simplicity of explanation, the one or more methodologies shown herein, e.g., in the form of a flow chart, are shown and described as a series of acts, it is to be understood and appreciated that the present invention is not limited by the order of acts, as some acts may, in accordance with the present invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

At 200, the customer inputs data related to the items for purchase. This may be done by manual entry of, e.g., barcode data of the item, into the data input component of the system 100 of FIG. 1 or general item data that returns matching item information from a database of shopping items for addition to the shopping list. Alternatively, this may be done automatically via a scanning mechanism, whether it is optical (e.g., a barcode reader or imager), magnetic (e.g., a magnetic strip reader), or an active/passive transponder system. In any case, the portable device stores the item data therein for later transmission and processing in accordance with the present invention.

At 202, once the shopping list is compiled in the portable device, the list is transmitted to a remote personal agent (RPA) that synchronizes consumer shopping lists in real-time with a global network of commercial partners (or vendor subscribers). The consumer maintains the personal shopping list on the portable device, e.g., a connected personal digital assistant (cPDA) that has access to several types of compatible networks. At 202, the user uses the cPDA to transmit the shopping list to the RPA over whichever network it has access to at the time. At 204, the RPA then transmits the list to subscribing partners, and collects bids from the software agents of commercial partners and individuals registered to the service, as indicated at 206. The RPA alerts the consumer when bids match their preferences, including price, a digital photograph or 3D model, and delivery terms, as indicated at 208. At 210, the customer (or consumer) than selects the vendor that will provide the items. It is to be appreciated that although the consumer may choose the bid process for shopping, he or she may override the bid criteria to select a vendor who, e.g., is not the lowest bidder, or is not the closest, or has a better reputation for quality, and according to many other criteria. At 212, the consumer then initiates payment by any of the approved methods, e.g., credit card, personal checking account, credit accounts, and so on. The process then reaches a Stop block.

The effectiveness of the cPDA for m-commerce applications depends on how often the consumer carries it around. Therefore, a wearable device such as a watch is much more likely to succeed in this class of applications. While carrying the cPDA, the consumer is likely to make purchase decisions in real-time based on timely or location aware alerts. The cPDA may also combine traditional calendar, email, phonebook, and cellular telephone functions in order to increase its utility and likelihood of being carried around.

For in-store applications, a security enhanced personal shopping system is provided that utilizes the cPDA within the proposed framework of RPA services. That is, RPA databases may be cached onto a local store server (e.g., of a backoffice system) for faster transactions. This mode also provides the consumer with a more secure connection via an encrypted wireless network. It also provides the local application with more direct access to the consumer to authenticate billing information, and supplement the shopping excursion with additional impulse and location-triggered purchases.

Since security is one of the strongest impediments to large-scale deployment of m-commerce systems, the novel architecture includes a secure self-shopping system as part of the secure payment phase. The system utilizes the EAS system incorporating a bi-stable and resettable EAS extension of RFID tags. This bi-stable property provides protection against accidental bit reversals due to uncontrolled magnetic fields. The resettable property allows the personal shopper to process returns on the spot by restoring the EAS bit to its initial state. While in the store, the location aware aspect is further enhanced by introducing the capability to locate the items within an arms-length of accuracy. To do so, RADAR-like properties of the RFID backscattering are used.

Figure 3:
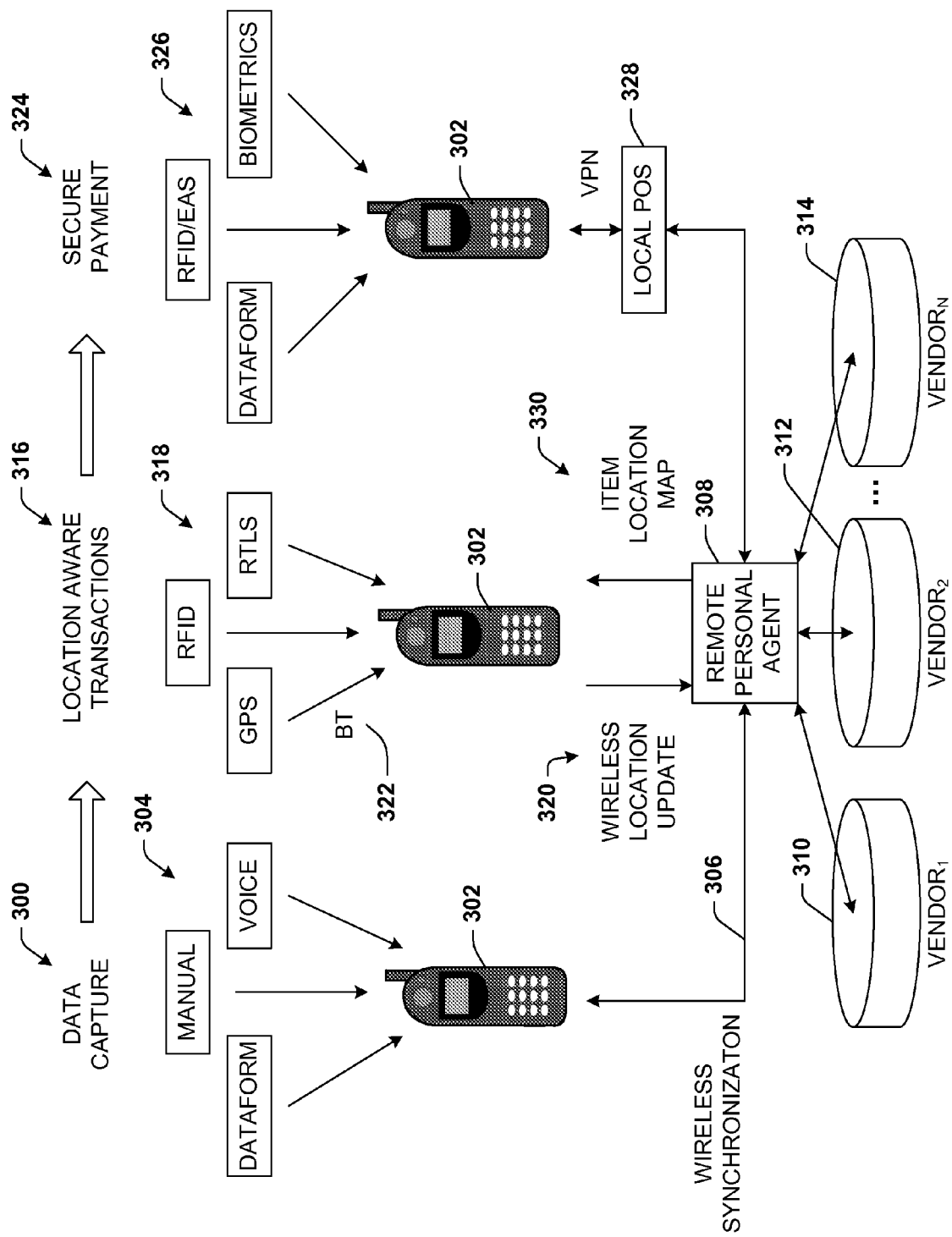
FIG. 3 illustrates a diagram of at least three technologies utilized in the architecture of the present invention.

Referring now to FIG. 3, there is illustrated a diagram of at least three technologies utilized in the architecture of the present invention. These include data capture, location aware computing, and secure payment. Additionally, the system is managed (or coordinated) through the services of an online RPA 308 that establishes e-business partnerships with local retailers and commercial enterprises. These commercial partners have the opportunity to competitively bid for items in the consumer's personal shopping list.

In a data capture phase 300 the consumer constructs a personal shopping list. A portable device 302 (similar to the data input component 102 of FIG. 1 and device of FIG. 9 and FIG. 10), e.g., the cPDA (although illustrated herein as a multifunction telephone with data reading capability), provides the user with flexible data capture options 304 for inputting product and/or service data. These data input options 304 include, but are not limited to, voice recognition, manual input via a keypad or pen-based handwriting recognition input system, a dataform reading system, which includes a transponder processing system.

For example, the consumer may be listening to a radio program review of a new music CD or book and decides to enter this information into the cPDA via speech recognition. Later, the consumer may be dining with friends and decide that the recommended wine was excellent. At this point, the consumer may scan the barcode on the wine bottle label and enter the quantity and maximum desired price threshold. At home, the consumer may be browsing a magazine and notice an advertisement for a particular fragrance. After scanning the barcode associated with the fragrance, the cPDA adds it to the stored personal shopping list and prompts the user for a quantity and price range. The user may also decide not to enter a price range and have the RPA 308 present offers based on bids received from vendors (or commercial partners) 310, 312 and 314 (also denoted as $VENDOR_1$, $VENDOR_2$, ..., $VENDOR_N$). The consumer may also establish personal preferences such as filters that present only certain offers. For example, the RPA 308 may filter and present only offers that are located within a certain radius of their home, or options for overnight delivery.

The portable device 302, the cPDA in this discussion, is the central device that maintains an updated shopping list through synchronization with any other data capture alternatives that the consumer may be using around the home or office. Note that when using the terms "portable device" and "cPDA", it is understood that other devices are included, for example, a mobile e-commerce and m-commerce device such as a cellular telephone configured to read a variety of dataforms, e.g., barcodes, magnetic strips or media, and transponder devices (whether active or passive devices). Appliances suitably configured may synchronize wirelessly with the cPDA, whether at home or the office, such that the shopping list in the cPDA is updated. For example, when the consumer scans the barcode of an item with a reader that is integrated into an appliance, e.g., a refrigerator, microwave oven, or some other appliance, the appliance will synchronize with the cPDA to update the shopping list with that list already existing therein over, e.g., a Bluetooth or Wi-Fi link. Of course, wired synchronization may also occur where the consumer places the cPDA in a cradle that connects to the networked appliances to receive product and/or service information.

The cPDA, periodically or on demand, further synchronizes the shopping list and personal preferences with the RPA 308 over a network, e.g., a wide or local area network, as indicated by the connection 306 between the device 302 and the RPA 308. At this point, unresolved identification codes will be updated with an appropriate item description. This avoids the need to store a large item description database locally on the cPDA. The periodicity of synchronization may be determined from personal preference settings, which may include the time since the last synchronization, a predetermined day of the week, when the device memory reaches a predetermined limit, when the item selected is one of high priority (e.g., like medical prescriptions, necessary food stuffs . . . ), and other options provided by the device 302.

In a location aware phase 316, the cPDA generates an alert when the consumer is physically close to an organization or another registered user who wishes to, for example, offer the requested item or quantity of an item on the personal shopping list, and can also make the offer within the requested price range and delivery terms. Of course, criteria other than these may be imposed, or invoked in addition to these. However, location aware transactions are optional. That is, the consumer may wish to shop for items online without touching or physically evaluating them. For example, the consumer may enter a request for airline tickets, music CDs, or books within a particular price range and await an alert from the cPDA once the RPA locates a bidder.

The consumer's physical location may be determined by at least any of the position location technologies 318 shown in FIG. 3, e.g., GPS, RFID, and RTLS. A Real Time Locating System (RTLS) is a fully automated system that continually monitors the locations of assets and personnel. An RTLS solution typically utilizes battery-operated radio tags and a cellular locating system to detect the presence and location of the tags. The locating system is usually deployed as a matrix of locating devices that are installed at a spacing of anywhere from fifty to one thousand feet. These locating devices determine the locations of the radio tags.

Location information 320 may also be obtained from any other location device or service nearby. For example, the cPDA may synchronize with the GPS system in a vehicle via a Bluetooth (BT) cordless connection 322, and relay its coordinates to the RPA over a GPRS (General Packet Radio Services) wide area network. GPRS provides mobile bandwidth of 20K bit/s to 40K bit/s, faster than the 9.6K bit/s GSM networks of today, and act as a stopgap before 64K bit/s 3G (Third Generation) networks arrive. GPRS differs from GSM in that it is based on packet-switched, rather than circuit-switched, technology. This theoretically means that users should be able to establish a connection between their mobile devices and the network almost instantaneously, without the inconvenience or unreliability of a dial-up mechanism. The always-on nature of packet-switched connections also means that users can theoretically stay connected for as long as they want, or at least that the connection mechanism will be sufficiently quick and transparent to make it seem that way. This instant connectivity gives content providers an opportunity to develop services that deliver almost real-time information to customers.

The location update frequency may be correlated with the speed of the vehicle to minimize the number of transmitted packets at slower speeds. The RPA then returns the location information (e.g., coordinates) to the cPDA of nearby stores or individuals who wish to offer the consumer selected items within the requested price range. The cPDA updates the vehicle GPS system in real-time to display icons where the bidding stores are located.

As another example, the cPDA 302 may utilize position coordinates from an integrated GPS module. The RPA may also partner with mobile phone providers to gain access to registered consumer Enhanced 911 (E911) cellular or Wi-Fi local area network positioning coordinates. The wireless E911 rules seek to improve the effectiveness and reliability of wireless 911 services by providing 911 dispatchers with additional information on wireless 911 calls. With E911 technologies, rescuers are able to pinpoint a caller's location to within a few dozen meters. Thus, for example, if the consumer is browsing a shopping mall or strolling along a main street, registered storefronts with Wi-Fi systems can provide the required connectivity and location updates to the RPA. Once inside the store, the consumer will be able to quickly locate items on the shopping list by passively identifying RFID shelf location markers near the items.

Once RFID-EAS becomes more cost effective and pervasively deployed, RFID technology may eventually replace EAS technology as performance and cost improves. Thus consumers will be able to locate the items rather than their associated shelf tag.

In a secure payment phase 324, biometrics, RFID-EAS, and dataform (e.g., a barcode) processes 326 are used as inputs to facilitate the transaction. The biometric input includes, but not limited to, a fingerprint, voiceprint, handprint, iris imaging, signature analysis, etc. Since the consumer establishes a virtual private network (VPN) with their carrier, location and credit information is communicated to the RPA in privacy via a local POS (Point-of-Sale) system 328. Consumers are likely to be comfortable with this once they understand that most Internet based credit card transactions currently utilize these same VPN tunnels.

Upon entering a retail area or kiosk, the cPDA 302 performs a sign-on phase by registering and authenticating with the available wireless network server. The registration procedure incorporates biometric authentication of the user and/or device authentication. Devices that have embedded RFID tags and, therefore, a unique identification, may be authenticated even before it connects to the wireless network. The authentication process may be reciprocal whereby a secret key exchange takes place to establish a VPN connection.

At this point, the server synchronizes the relevant cPDA information such as those items for which the consumer is currently evaluating bids. After login and synchronization, the cPDA 302 displays location, quantity, price, and other relevant information about items on the personal shopping list for those items that are in stock. The consumer does not receive a location aware alert to evaluate a bid unless the store in fact stocks the requested quantity and can help the consumer find it within the store. Thus the system is operable to only show those items that are in stock such that the consumer is not surprised when arriving at a store location only to find out the item(s) is not available. The system provides to the consumer an item location map 330 of the store that highlights the location of each item. The consumer may also automatically locate the specific item if it or the shelf section that it resides contains an RFID tag. The cPDA 302 locates the RFID tag via the RFID-based ranging and direction-finding technology.

Once the consumer locates the item either manually or within the accuracy specifications of the RFID location system, the consumer must then scan the item's barcode to localize its identity and trigger the requested action. The action may be to connect to the product's web page, obtain performance benchmark information, or simply to purchase the item. If the customer wishes to obtain more information about the item, the cPDA will read both the barcode and the RFID tag, and send the combined identification codes to the server. For example, the consumer may scan the barcode on a CD or DVD to listen to or view samples of their content before making the purchase decision.

The cPDA 302 reads both the barcode and RFID tag because the barcode isolates and identifies the particular item among many others that may be nearby. The RF energy from an RFID reader cannot provide this localized identification because RF energy scatters and may excite nearby tags. This barcode feature is one of the few that RFID technology cannot yet provide. However, the RFID tag provides the important bi-stable, and resettable EAS function, as well as sufficient bits to support unique item identification. Therefore, the combined use of both RFID and barcodes is beneficial. Both codes identify the same item but to a different level of specificity. Although the barcode may identify a class of items such as medium-sized, white, cotton, long-sleeve shirt, the RFID uniquely identifies the specific item or the particular shirt in this example.

An effective personal shopping system yields control of the EAS functionality to the personal shopping device. However, doing so may easily compromise the overall security of the system. Therefore, the disclosed architecture includes a method of bi-stable and resettable EAS functionality combined with the RFID technology whereby the system requires a password to affect the EAS security bit. This mode of self-shopping provides a high degree of security and privacy while discouraging pilferage. The personal shopping experience is further enhanced with RFID technology that provides high accuracy product location by utilizing the controlled RADAR properties of backscatter RFID tags.

The overall framework shortens the time to market for suppliers while speeding up transactions for the consumer. This method of reverse commerce provides the consumer with greater control over their shopping experiences. Retailers bid competitively to match the consumer's price range instead of the consumer having to shop around and haggle for the best prices. The consumer is still able to touch and physically evaluate items in a traditional store while staying within the framework of on-line commerce.

Solving privacy and security issues rank among the most important factors for ensuring the growth of m-commerce technology. Consumers prefer privacy but suppliers would like to continue to be capable of identifying items for recall or returns. Therefore, completely disabling the RFID tag does not solve this problem. The disclosed architecture provides an indirect method that allows only registered and authenticated users and devices to retrieve specific and relevant product information via a VPN connection.

In this proposed framework, a product lookup code (PLC) is derived from the UID. This prevents unauthorized systems from reading RFID tags and determining information about the item or the consumer, especially after purchase. In this scenario, the non-line-of sight feature of RFID is also an impediment because RFID tags can be read discretely by a rogue system. Some standards incorporate a "kill" feature that disables the tag after the item has been purchased. However, this eliminates the opportunity for automatic processing of returns and recalls, which are among some of the main applications proposed for RFID. Therefore, an alternate method is provided whereby the UID is not the same as the PLC.

The server derives the PLC from the UID, filters the associated data, and provides only the relevant information to a consumer who is an authenticated and registered user. Since rogue systems are not likely to register and authenticate, this framework maintains consumer privacy without compromising some of the important RFID applications. However, rogue systems may still track a UID but will not be able to associate it with private consumer information. For example, rogue systems may track the UID from Speedpass™ key fobs (a lightweight and smart ID token for attaching to luggage or products) as consumers pass through antennas in doorways, but this is not a significant consumer concern as yet. Only authorized systems such as the store itself will have the capability to associate a UID with information in a specific consumer's private record. In this case, the consumer is given the opportunity to decline participation in the associated loyalty discount, or personalized service programs for which tracking privileges are required.

To complete the purchase, the personal shopping system supplies a unique EAS password to the tag for comparison with a stored password on the tag. The RFID tag performs a simple comparison and affects the EAS bit accordingly if the password matches. The server derives the unique password from the UID via the cryptographic process illustrated hereinafter in FIG. 6. This process requires secret keys from both the retailer and the tag manufacturer. Tags may be supplied with the unique passwords already programmed or they may be programmed at the time of source marking.

The cPDA must also verify that the EAS bit was properly affected, and provide the server with an acknowledgment so that the purchase is registered for accurate billing. If the consumer decides not purchase the item, another scan with the appropriate "remove" button will trigger a sequence that appropriately programs the EAS bit and updates the consumer's account. Separate and different passwords are required when enabling or disabling the EAS trigger. This forces all transactions with the RFID tag to be registered with the server.

The secure payment module within the cPDA is a separate protected device that must reciprocally authenticate with the cPDA's operating system. This prevents a rogue CPU from snooping and storing EAS passwords for later use. However, unless encrypted a rogue system may still sniff passwords and UIDs from the air interface during RF communications. Since every item has a unique identification and an associated unique password, each can be sensed only during a purchase followed by a return transaction. This purchase-return sequence is the only opportunity for a rogue system to sniff the UID and password for a specific item that will remain in the store. Therefore, retailers may program their systems to increase scrutiny of items that have been purchased and returned in quick succession. For example, the system may begin to monitor the movement of those specific items for a certain period of time as well as identify the RFID energy from any nearby cPDA that may not be registered. With the RFID infrastructure in place, the system may additionally query the EAS bits of those returned items if they are still within view. Although this method cannot prevent pilferage, it provides a level of security that increases the difficulty and expense for doing so.

Figure 4:
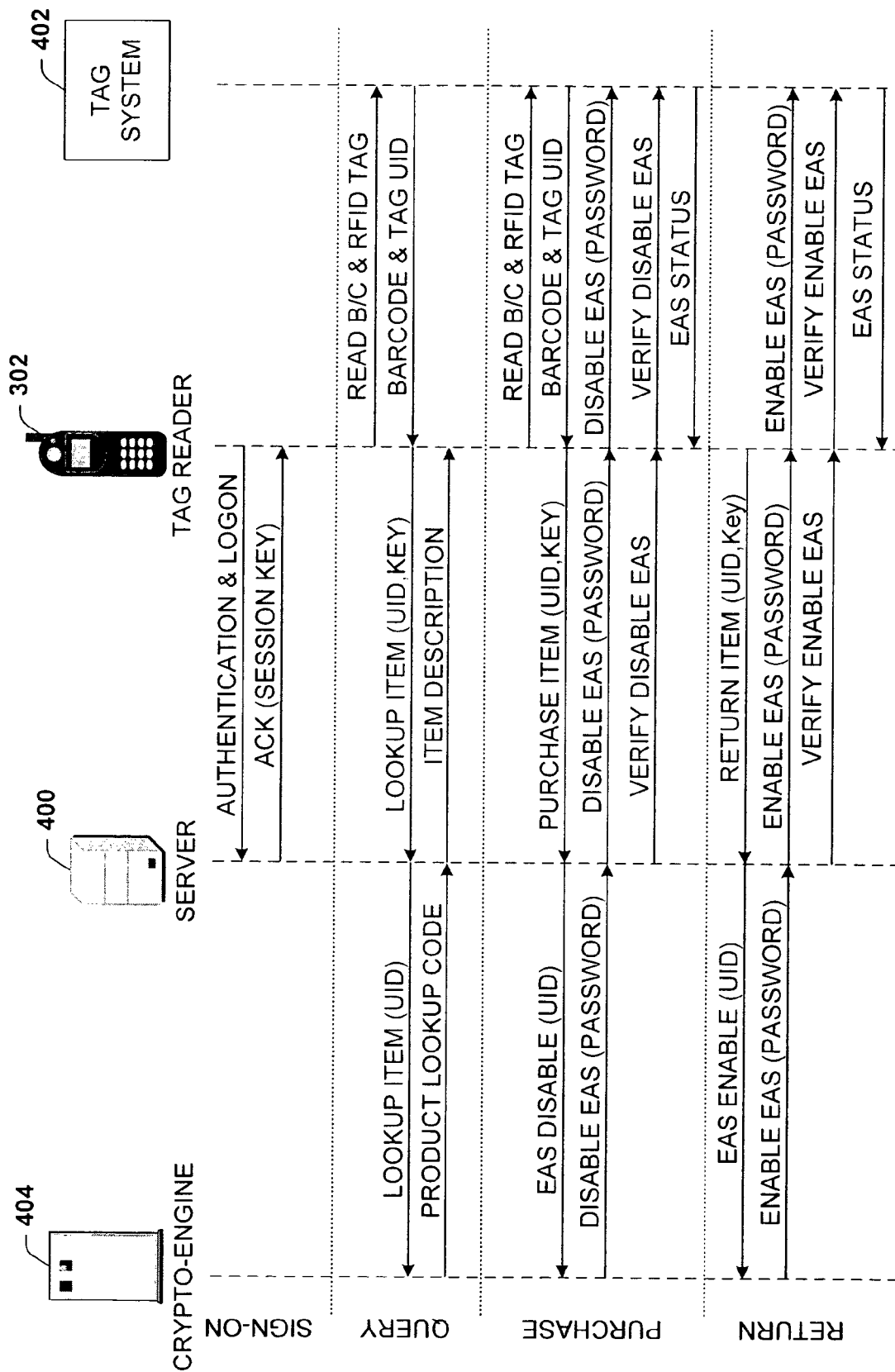
FIG. 4 illustrates a signal flow diagram between various entities of the present invention.

Referring now to FIG. 4, there is illustrated a signal flow diagram between the various entities of the present invention. During the sign-on phase, the cPDA 302 transmits logon and authentication signals to network server 400. After proper authentication and log-on, the server 400 then returns a session key to the cPDA 302 in an acknowledgement (ACK) signal.

In a query phase, the cPDA 302 reads a dataform, e.g., the barcode, and RFID information from a tag memory system 402 of the product or service. The information extracted therefrom is barcode and tag UID. The cPDA then passes the session key with the UID to the server 400, which is then forwarded to a decryption engine server 404 (also denoted as the crypto-engine) for encryption/decryption processing, depending on the purpose. The engine 404 may be a component separate from the server 400 and the engine 404 may also be part of the server 400. The engine 404 uses the UID to perform an item lookup in a database of products and services. If the item is listed as in stock, the PLC is returned to the server 400. The server 400 then obtains the item description associated with the PLC, and passes the item description to the cPDA 302 for presentation and/or storage to the consumer.

In a purchase phase, the cPDA 302 reads a dataform, e.g., the barcode, and RFID information from the tag memory system 402 of the product or service. As before, the information extracted therefrom is barcode and tag UID, which is returned to the cPDA 302. The cPDA 302 sends the session key and a purchase item signal to the server 400, which then sends an EAS disable signal and the UID to the engine 404. The personal shopping system via the engine 404 supplies a unique EAS password with a disable EAS signal for comparison with a stored password on the product tag memory system 402. The server 400 derives the unique password from the UID via the cryptographic process illustrated in FIG. 6. This process requires secret keys from both the retailer and the tag manufacturer. Tags may be supplied with the unique passwords already programmed or they may be programmed at the time of source marking. The password and disable signal, along with a verify disable EAS signal, are passed from the server 400 through the cPDA 302 to the product tag system 402. The RFID tag system 402 performs a simple comparison and affects the EAS bit accordingly, if the password matches.

The cPDA receives the password and affects the EAS bit within milliseconds of scanning both the barcode and associated RFID tag. During this very brief time, the consumer will not be aware of the time difference between scanning the item and programming the EAS bit. This time latency depends on the speed of the wireless access technology (e.g., IEEE 802.11a/b/g) and network congestion. However, these services may be prioritized with intelligent bandwidth provisioning systems.

The cPDA must also verify that the EAS bit was properly affected, and provide the server with an acknowledgment so that the purchase is registered for accurate billing. Thus an EAS status signal is then returned from the tag system 402 to the cPDA 302 to confirm that the tag system 402 has disabled the product tag.

If the consumer decides to return or not purchase the item, another scan with the appropriate "remove" button triggers a sequence of signals that appropriately programs the EAS bit and updates the consumer's account. The cPDA 302 sends a return item signal with session key and product UID to the server 400. In response thereto, the server 400 sends an enable EAS signal with UID to the engine 404 to receive a reactivate EAS signal and password. The server 400 forwards the enable EAS signal and password along with a verify enable EAS signal to the cPDA, which forwards the signals to the tag system 402. The RFID tag system 402 performs a simple comparison and affects the EAS bit accordingly, if the password matches, and returns an EAS status signal to the cPDA to confirm that the product tag has been enabled. Separate and different passwords are required when enabling or disabling the EAS trigger. This forces all transactions with the RFID tag to be registered with the server.

Figure 5:
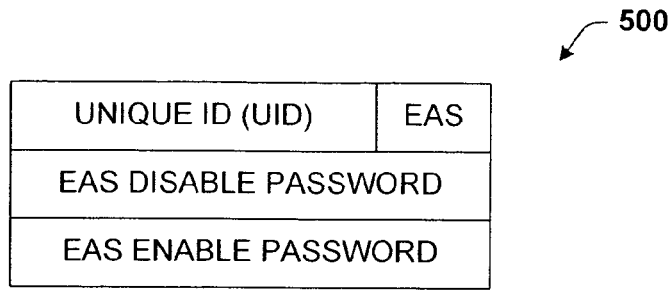
FIG. 5 illustrates a diagram of the fields of a tag memory of a product RFID tag.

Referring now to FIG. 5, there is illustrated a diagram of the fields of a tag memory 500 of a product RFID tag. The memory 500 includes a unique EAS disable password and EAS enable password, a unique ID, and EAS bit field for toggling according to the process. The tag can only be enabled or disabled operationally with a password that is generated by the crypto engine.

Figure 6:
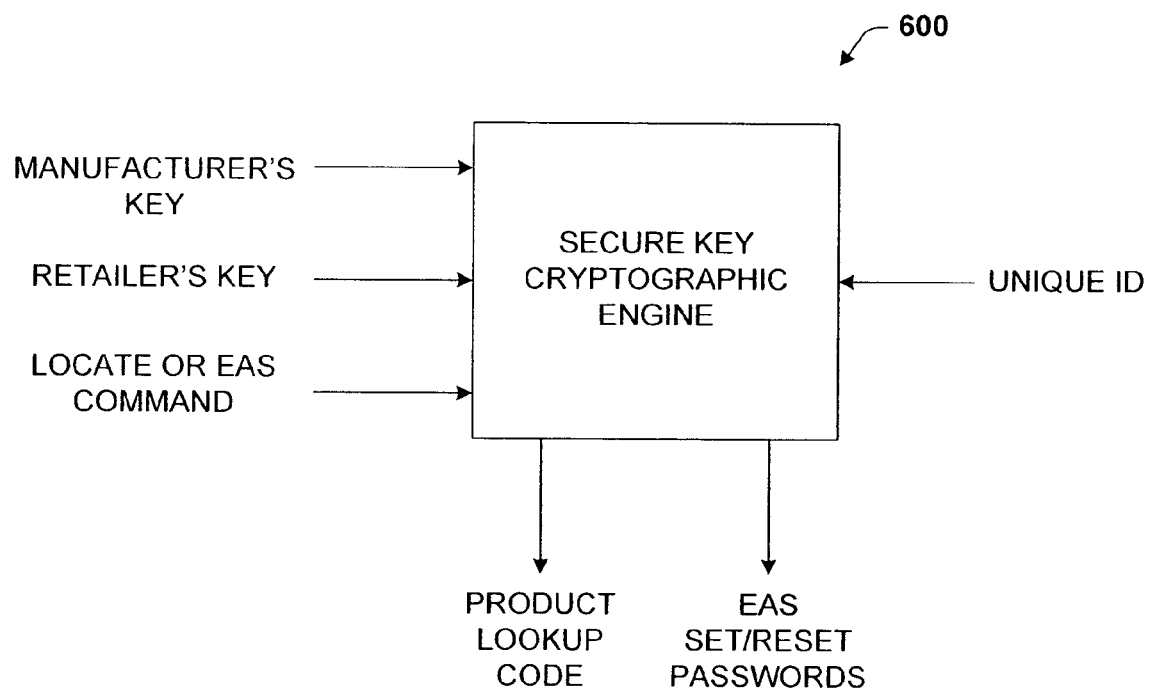
FIG. 6 illustrates a diagram of the inputs and outputs of a crypto engine used according to the present invention.

Referring now to FIG. 6, there is illustrated a diagram of the inputs and outputs of a crypto engine 600 (similar to the crypto-engine 404) used according to the present invention. The engine 600 receives as inputs the UID, manufacturer's key, retailer's key, and a locate or EAS command. The outputs are the PLC and the EAS set/reset password commands. Thus the engine 600 uses several inputs to uniquely distinguish a product/service from other items of commerce within a shopping environment. The UID is the unique code assigned to the product/service or item by the retailer. The manufacturer's key may be provided by the manufacturer as part of the account information when the manufacturer subscribes to the disclosed architecture, or generated by the retailer's in-house accounts system, or by any other means. In any case, all that matters is that the manufacturer's key be unique from other manufacturer keys in system use, and that may be mapped back to the original manufacturer.

Similarly, the retailer's key is uniquely defined for a particular retailer, and store in the retailer chain. This is so that the location of the article of commerce is distinguishable from other similar items in a geographic sense. Thus if a consumer is traveling in the geographic area, the store in that chain of relailer's stores can be matched to the location of the consumer such that the consumer is signaled. Of course, such key can be used for many other purposes, such as tracking all articles of commerce (and inventory) assigned to that store for sale (and use).

The locate or EAS command input is used to select whether to either initiate a locate command for locating an item in the store, or for initiating an EAS command to enable/disable the security alarm feature.

The PLC is derived at least from the UID, and is specific to the store, or chain of retail stores. Thus generation of the PLC may also include use of the manufacturer and retailer keys.

The EAS password allows the cPDA to set or reset the EAS security bit.

Figure 7:
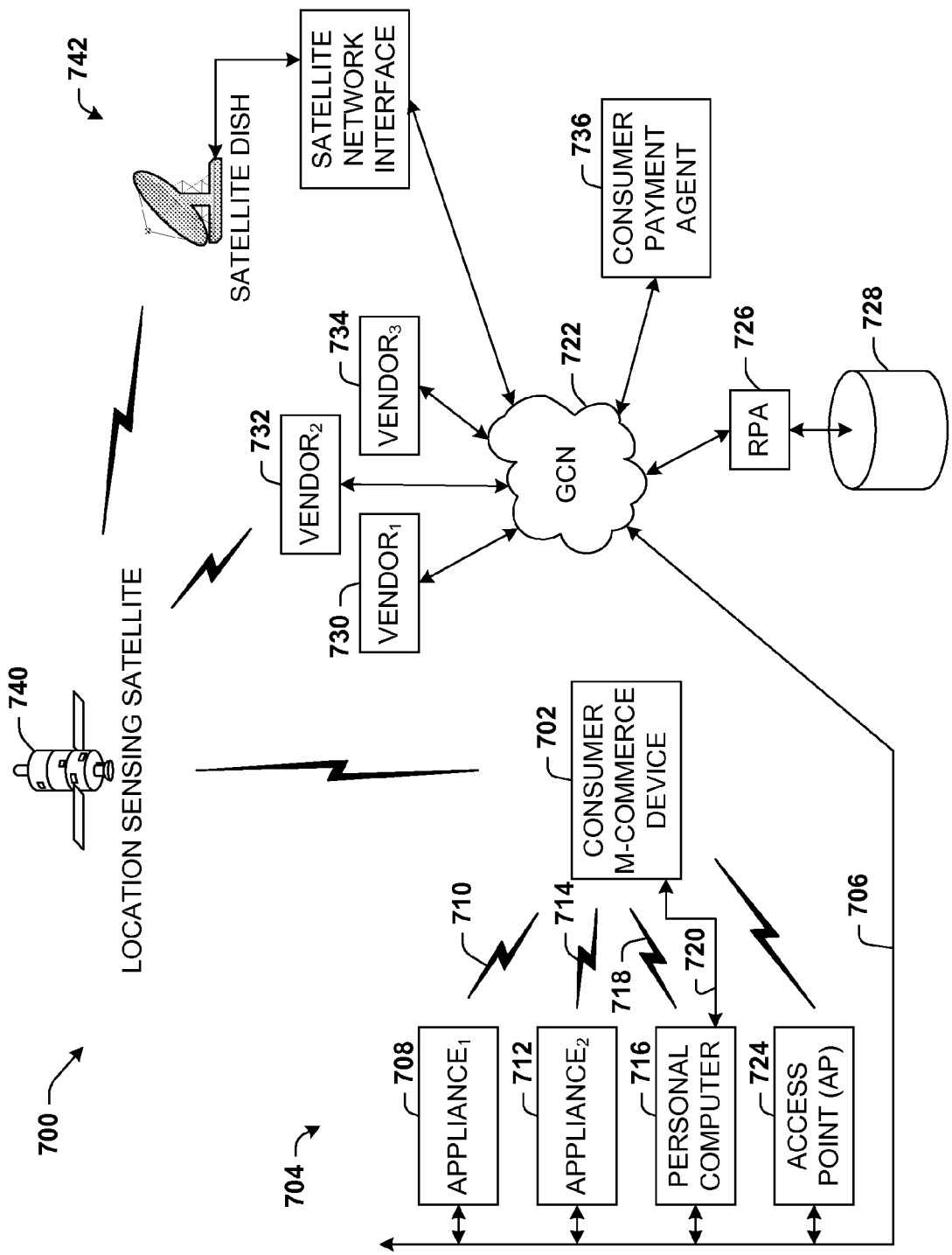
FIG. 7 illustrates a block diagram of a network for appliance uploads and geographical awareness, in accordance with the present invention.

Referring now to FIG. 7, there is illustrated a block diagram of a network system 700 for appliance uploads and geographical awareness, in accordance with the present invention. An m-commerce device 702 (similar to the data input component 102, portable device 302, and device 900 of FIG. 9) includes a wireless communication capability in accordance with various wireless technologies described herein. There is also provided one or more appliances 704 operable to transmit/receive information wirelessly and/or across a wired network 706. That is, a first appliance 708 (also denoted APPLIANCE$_1$) that may be disposed on the network 706 may also communicate data and signals with the device 702 over a wireless link 710, a second appliance 712 (also denoted APPLIANCE$_2$) that may be disposed on the network 706 may also communicate data and signals with the device 702 over a wireless link 714, and a personal computer 716 that may be disposed on the network 706 may also communicate data and signals with the device 702 over a wireless link 718. In accordance with conventional technologies, the device 702 may also communicate directly with the computer 716 over a wired serial connection 720, e.g., USB (Universal Serial Bus) and/or IEEE 1394. Additionally, the wireless protocols utilized for the links (710, 714, and 718) may be in accordance with a Bluetooth short-range network communication technology, or similar architectures.

In order to facilitate wireless access by the mobile device 702 to the local network 706 and a global communication network (GCN) 722 (e.g., the Internet), the network 706 has disposed thereon a wireless interface 724 (conventionally known as an access point). Thus once the user has retrieved all product information from the appliances (708 and 712), computer 716, from manual entry and, scanning and sensing processes, the user initiates upload of the data in the form of a shopping list to an RPA 726 disposed on the GCN 722. This may be done manually, or automatically. Since the device 702 operates in an "always-connected" environment, the shopping data may be uploaded automatically for storage in the RPA database 728 in association with the consumer account. The data may be uploaded automatically according to the input of each shopping item, groups of items, or when the list reaches a predetermined size. Other criteria that trigger automatic upload to the RPA 726 may include, but is not limited to, the type of items being purchased, quantity, cost, time of input to the device 702, date of input, and many other criteria that provides an enhanced shopping experience.

The RPA 726 has associated therewith a database 728 of at least user account and preferences information and commercial partner (i.e., vendor) information. The vendor information supports system interaction with, in this particular embodiment, three vendors that are disposed in communication with the GCN 722, a first vendor 730 (also denoted VENDOR$_1$), a second vendor 732 (also denoted VENDOR$_2$), and a third vendor 734 (also denoted VENDOR$_3$). Of course, the system supports a much larger number of users, user accounts and preferences information, vendors, and vendor account information. In support thereof, the RPA 726 may include a plurality of server-type systems distributed on the GCN 722.

In support of online transactions, the system includes a consumer payment agent 736 disposed on the GCN 722 for facilitating payments from a consumer financial account to the RPA 726, which RPA 726 then utilizes its transaction payment system (not shown) to pay the vendor that accepts the shopping transaction. Thus the agent 736 includes, but is not limited to, an online banking system, a credit card company, a debit card company, a personal check online processing entity, and other such conventional systems. Consumer credit account information may also be obtained to ensure that the consumer will fund the transaction, and to prevent consumer fraud, all issues addressed by conventional systems. The system is operable to use secure online transaction architectures, such as Secure Socket Layer (SSL), and firewalls in order to protect consumer and vendor information.

The system also includes location awareness capability, which is facilitated by the use of satellite communication 740. Thus the satellite system 740 tracks the location of mobile device 702 at all times. Similarly, each vendor location is known, since the satellite system 740 tracks the vendor locations. Of course, the vendor locations typically do not move. However, the disclosed architecture facilitates tracking any subscribing vendor, whether moving or not. Such mobile vendor environments include the use of mobile showrooms that move from location to location for short periods of time, e.g., a few weeks at a location, selling merchandise. The system also includes a ground-based satellite transceiver system 742 that interfaces to the GCN 722 such that user location information may be communicated to the RPA 726. The satellite system 742 may be directly associated with the RPA system 726, or a commercial system from which services are transacted. Thus consumer personal and shopping information may be utilized in conjunction with the consumer's location to communicate to the consumer when he or she is approaching the proximity of a vendor that may stock an item on the shopping list, or for various other reasons.

For example, if the consumer seeks to purchase a big-ticket item such as a car, or major appliance, the RPA 726 receives and processes this information for bid by the subscribing vendors. If, for example, the consumer is traveling and approaches a vendor who may be considering a bid, the system is operable to notify the consumer that he or she will be traveling within close proximity of the vendor. Conversely, the system may also be configured to notify the vendor when the consumer is in the area, such that the vendor may then react accordingly by, for example, pushing additional information to the consumer mobile device 702 to entice them into the car showroom. The location awareness feature offers a tremendous capability for both the consumer and the vendor for facilitating a shopping transaction.

Note that in a more robust m-commerce framework, operation of the lower resolution location system (e.g., GPS and E911) related to a given consumer may be coordinated with the higher resolution tracking system (e.g., RTLS and RFID) such that once the consumer is in close proximity to entering the store, the external lower resolution system "releases" the task of locating the m-commerce device, and the internal higher resolution store system takes over the task of monitoring the location of the m-commerce device (and user) while in the store. Conversely, when the user leaves the store, the higher resolution system releases the task of monitoring, and the lower resolution system takes over.

Figure 8:
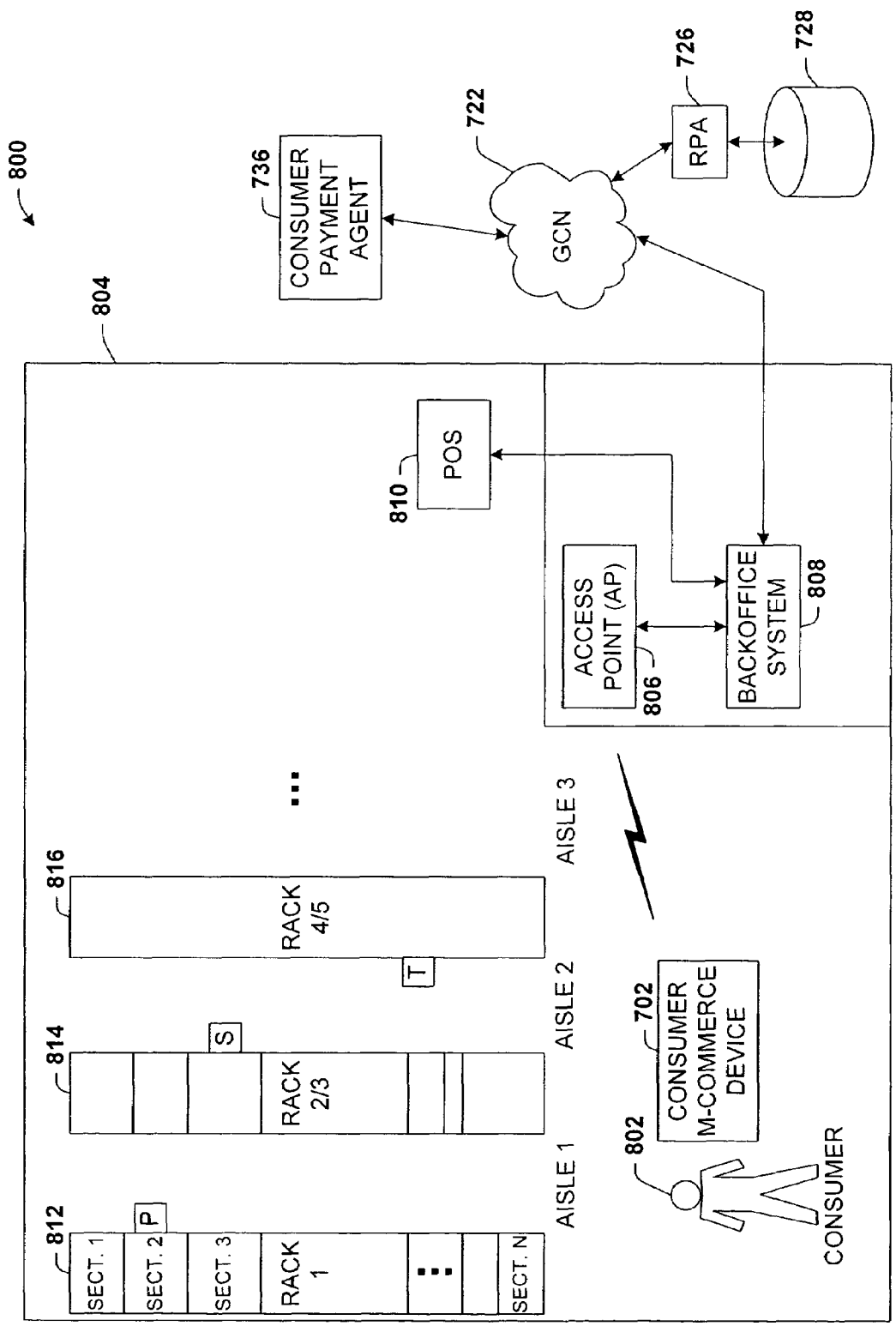
FIG. 8 illustrates an in-store shopping environment using the mobile m-commerce device in accordance with the present invention.

Referring now to FIG. 8, there is illustrated an in-store shopping environment 800 using the mobile m-commerce device in accordance with the present invention. The in-store environment utilizes the capabilities of the m-commerce device 702 in a different way. A consumer 802 may have come to the location of a store 804 based on the location-awareness capability of the present invention as illustrated in FIG. 7, where the availability of an item for sale, and the proximity of the consumer 802 to the store bidding to sell the item are sufficiently close to warrant the consumer 802 going to and entering the store to further discuss the transaction.

Once in the store 804, the device 702 is capable of communicating with the store network via a store access point (AP) 806. The AP 806 is disposed on a store backoffice system network included as part of the store's backoffice system 808. The backoffice system 808 includes at least all of the conventional store transaction and accounting systems required to complete a purchase transaction, including access to the agent 736. Additionally, the backoffice system 808 includes the hardware and software capabilities required of the present invention related at least to location-awareness, wireless communication to the m-commerce device 702 to the store systems, RF tag pulsing and sensing capabilities (e.g., and RF transceiver system), and data communications via the store network to the RPA system 726 and its database 728. The store network also includes one or more point-of-sale (POS) systems 810 for processing normal consumer checkout transactions. The backoffice network connects to the GCN 722 using conventional network means, either wired or wireless, by way of routers, switches, and/or firewalls. As indicated hereinabove, the RPA database 728 may be cached on the backoffice system 808 for in-store applications.

The store 804 includes several item racks (812, 814, and 816) assigned by aisles (e.g., Aisle 1, Aisle 2 . . . ) for stacking and presenting items for sale. Thus Racks 1 and 2 are associated with Aisle 1, Racks 3 and 4 are associated with Aisle 2, and so on. The racks (812, 814, and 816) may also be divided into smaller physical locations for further locating specific items. For example, an item "P" is located at Section 2, of Rack 1, Aisle 1. Alternatively, the racks (812, 814, and 816) may have RFID transponders located at general rack locations such that when the consumer 802 wants to locate an item, he or she is directed to a general location in the aisle where the item can be found, and not to the specific location of the item in the aisle.

In operation, the device 702 is operable to receive information from the store backoffice system related to a consumer shopping list uploaded earlier to the RPA 726. Since the architecture of the present invention can detect that the consumer 802 is at the store 804, through the location-awareness aspect of the present invention, which may be the store offering to bid on the shopping list or perhaps the store that has been awarded the bid, the store backoffice system 808 may access the consumer shopping list and related consumer account and preference information from the RPA 726, in order to better server the consumer 802. This includes transmitting information to the device 702 that facilitates the consumer 802 finding shopping list items in the store. The information may simply be in the form of a table of information related to an aisle number, rack number, and location on the rack. For example, if the shopping list item includes an item "P", which is physically located at aisle 1, rack 2, section 1, such information may be transmitted from the RPA 726 to the store backoffice system 808, and then to the device 702 for display to the consumer, such that the consumer then simply walks to the corresponding aisle, rack, and section to retrieve the item P.

Alternatively, utilizing the RFID capabilities of the present invention, once the consumer 802 enters the store, and the backoffice system 808 is "made aware" of the consumer's presence via the location-awareness system, or a store registration process. The consumer 802 controls the device 702 to pulse items on the shopping list, in response to which RF signal backscattering facilitates identifying the location of the item. The item location is then presented to the user via the device display. Since the product tag memory does not include location information, the store backoffice system facilitates location tracking by detecting the pulsed information from the item P, and associates the pulse with the device 702. This information further facilitates linking the item P to the consumer 802 such that the item P location information is then transmitted to the device 702 for presentation to the consumer 802. More sophisticated detection and correlation techniques may need to be employed where several consumers are pulsing the same product. However, this can be overcome using triangulation technologies in conjunction with signal timing techniques to discriminate which consumer requested the information. Alternatively, since several consumers requested the same item information, the item location can be simply broadcast to all requesting consumers.

In an alternative item location process, the backoffice system receives a signal from the device 702 related to an item "S" that the consumer 802 wants to find. The backoffice system 808 then transmits a pulse to that particular item, in response to which the consumer's device 702 receives the tag information.

The store backoffice system 808 may also present a map to the device of the user, which has been described hereinabove. Where the device 702 includes touch screen capability, the consumer 802 may touch the item graphic to receive directions thereto, further item information from either the backoffice system database and/or link to a website, or simply walk to the aisle, rack, and section provided in tabular form.

The consumer may complete the transaction using online transaction schemes, or may checkout via the POS 810.

Figure 9:
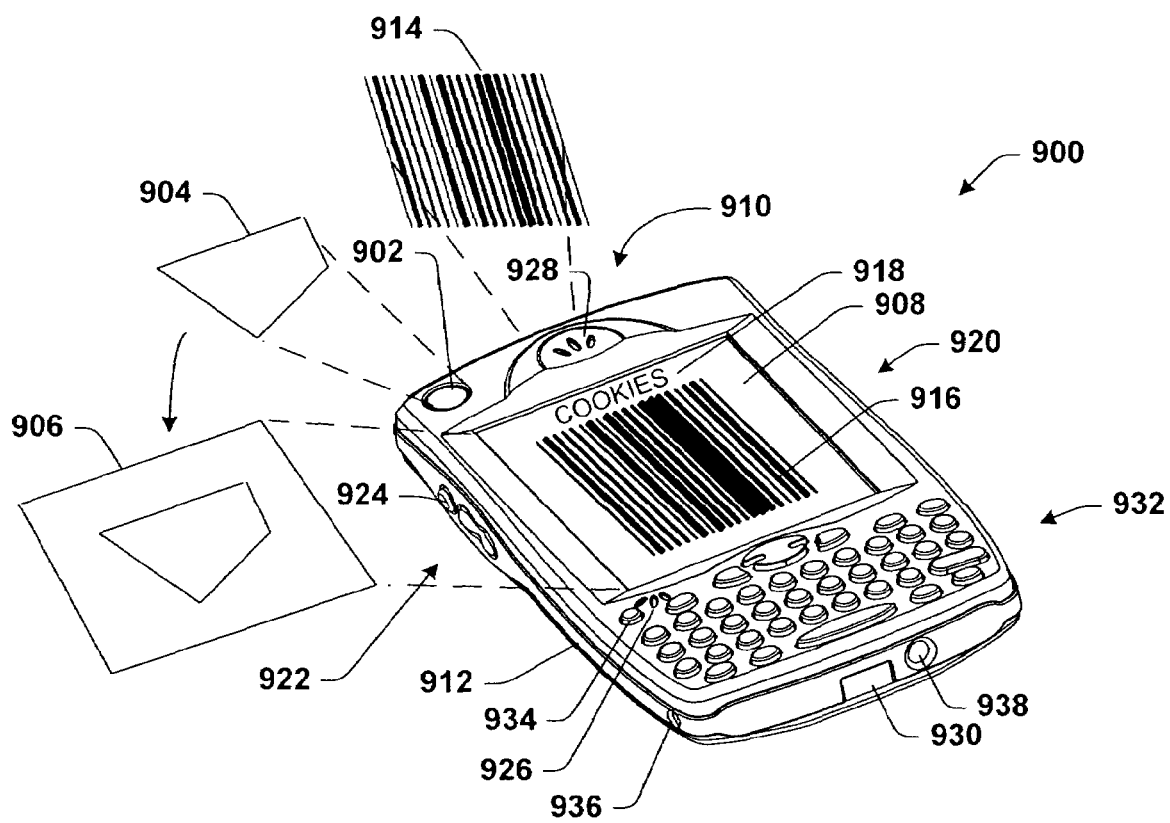
FIG. 9 illustrates a mobile terminal device suitably configured for use with the present invention.

Referring now to FIG. 9, there is illustrated an isometric of an m-commerce terminal device 900 (e.g., the cPDA, and similar to device 702) suitably configured for use in accordance with the present invention. The device 900 includes an image capture system 902 for use in capturing image data 906 of an item 904 (e.g., single images or a short series of image frames that playback as a movie) according to onboard memory capabilities. Images are recorded by facing the device 900 toward the item 904 to be imaged. The captured single images may be displayed separately to the user via a display 908 or as a short movie. Thus the device 900 includes hardware and software for image processing and playback. The display 908 may be an LCD with touch panel capability for interactive use.

The device 900 may also include a dataform reading assembly 910 (not visible) that is located on a top portion of a housing 912 of the device 900, which assembly 910 is used for reading numerous types of dataforms (e.g., 1-D with Reduced Space Symbology capability, 2-D and 3-D), in generally, a forward-pointing direction. The housing 912 provides a ruggedized enclosure, e.g., sealed according to an IP54 standard. The dataform reading assembly 910 has different optical characteristics (e.g., focal length) than the image capture assembly 902. When scanning a dataform 914 (e.g., barcodes), the dataform reading assembly 910 is operable to focus on a target that includes a barcode or other dataform symbols. An image sensor of the dataform reading assembly 910 detects the light reflected or scattered from the target barcode symbol. The image sensor is positioned in the terminal device 900 along an optical path such that it has a forward field of view that ensures the capture of a portion of the light reflected or scattered off the targeted dataform symbol. The captured portion of reflected light is subsequently detected and processed into electrical signals representative of the barcode image.

Electronic circuitry and/or software in the terminal device 900 processes the electrical signals into a digital representation of the data represented by the dataform 914 that has been scanned. For example, the analog electrical signals outputted by the reading assembly image sensor may be converted into a pulse width modulated digital signal, with widths corresponding to physical widths of the bars and spaces of the barcode symbol 914. The digitized signals are then decoded based upon specific symbology utilized by the datafomm, into a binary representation thereof and subsequently to the corresponding alphanumerical characters for presentation to the user via the display 908. A barcode image 916 of the barcode dataform 914 and/or the decoded product information 918 (e.g., "Cookies") may be processed for presentation on the display 908. The processed product information may also be output via audio signals to the user such that the user perceives the device 900 announce that the scanned barcode 914 belonged to a certain product (e.g., "Cookies").

The device 900 may also include a magnetic media reader system (not shown) for reading magnetically recorded data, e.g., credit cards, personal data cards provided by stores and merchants, and the like. The magnetic media may be brought into close proximity with a magnetic reader system sensing head 920 (not visible) that is exposed through the housing 912.

The device 900 also includes one or more input/output ports 922 for transmitting and receiving image and text content, communication signals, and audio signals. The ports 922 may include a USB (Universal Serial Bus) port, IEEE 1394 port, IrDA (e.g., according to 1.2 standard Serial Infrared (SIR)), or other conventional serial communications architecture operable to connect to a host computer, and/or peripheral device, such as a printer. Note that in lieu of or in combination with the physical ports 922, a wireless interface may be used at least for direct sequence and frequency hopping wireless communications according, e.g., IEEE 802.11a/b/g standards and in support of WPAN (Wireless Personal Area Network, e.g., Bluetooth IEEE 802.15), WLAN (Wireless Local Area Network), WWAN (Wireless Wide Area Network) and other wireless communications schemes. WWAN capability, such as GPRS, GSM or CDPD, facilitates continuous coverage when riding in, e.g., a taxi, and the need to reinitiate the logon process when moving between networks may be eliminated.

Additionally, the device 900 may connect to a wired network (e.g., a LAN, WAN) via a conventional network interface included as one of the ports 922. The device also includes VPN (Virtual Private Network) support for wired networks. As indicated above, the wireless interface also facilitates RF communication for, e.g., detecting and communicating with RFID transponder devices of products. The ports 922 may also include an audio receptacle port 924 for inserting an audio headgear jack of, for example, a microphone/headset or a stereo headphone.

The device 900 includes a telephony capability for processing telephone communications. In support thereof, the device 900 includes a telephone handset functionality with an internal microphone 926 for receiving voice and audio input, and a speaker 928 that provides voice and audio output to the user's ear. The physical arrangement of the microphone 926 and speaker 928 facilitates use of the device 900 as a conventional wireless telephone handset. The device 900 also includes an antenna (not shown) for communicating wirelessly in accordance with at least the various wireless system capabilities described herein, for receiving RF signals, e.g. broadcast radio music signals, and so on. Transport optimizations apply data compression at the session level—before the data is encrypted, and adapt the message for the specific network over which it will travel, such as the WLAN, GPRS, CDMA (Code Division Multiple Access) or GSM.

When the user inserts the headgear jack into the device audio receptacle 924, not only will the user be able to use the device 900 as a telephone by conversing through an external head-mounted headset microphone, but also lift the microphone boom to then use the headgear as stereo headphones for listening to music received via the RF capabilities of the device 900. Additionally, the user may listen to music or audio data stored on a flash memory device that may be inserted therein via a flash memory slot 930. Such flash memory may be in any conventional form factor and include any amount and type of data for accessing by the user of the device 900, for example, audio, video, and data. The status of the headgear may also be displayed via the display 908 when plugged into the device 900, to include headset mode, headphone mode, boom up and down, and the content being listened to (e.g., telephone, artist, music title . . . ).

The device 900 also includes the capability for Multimedia Messaging Service (MMS), which as the name suggests, is the capability to send and receive messages comprising a combination of text, sounds, images, and video between MMS capable systems, handsets or devices. Thus text/graphics content associated with web pages and the like may be presented to the user via the display 604.

The device 900 also includes a keypad 932 for manual input of text and commands for control thereof. The keypad 932 includes a full set of user interface keys for facilitating the input of information and/or operational commands by the user, the keypad 932 including alphanumeric capability, function keys, control keys, etc. The keypad 932 may be backlit (e.g., LEDs) to facilitate navigating the display 908 and interacting with displayed information. For example, where clipped web page content is presented, the user may interact therewith to select options and navigate the page. The keypad 932 also facilitates dialing telephone numbers, accessing data tables of contact information (e.g., names, addresses), entering login information for accessing packet networks, configuring the device 900, and so on. To further facilitate interacting with the device 900, there may be provided a stylus pen (not shown) or a light pen. Such a light pen facilitates the use of a signature pad on the display area 908, and for selecting options on a page receptive to such an interface.

A power button 934 is included for powering the device 900 on or off. Optionally, the device 900 may be powered down automatically after a period of inactivity, to extend onboard battery life. An external power connector 936 accommodates an external power source for charging the onboard batteries and powering the device 900. A record status indicator 938 reports the success of a dataform scan to the user. Of course, such an indication may also be provided via the device display 908.

Figure 10:
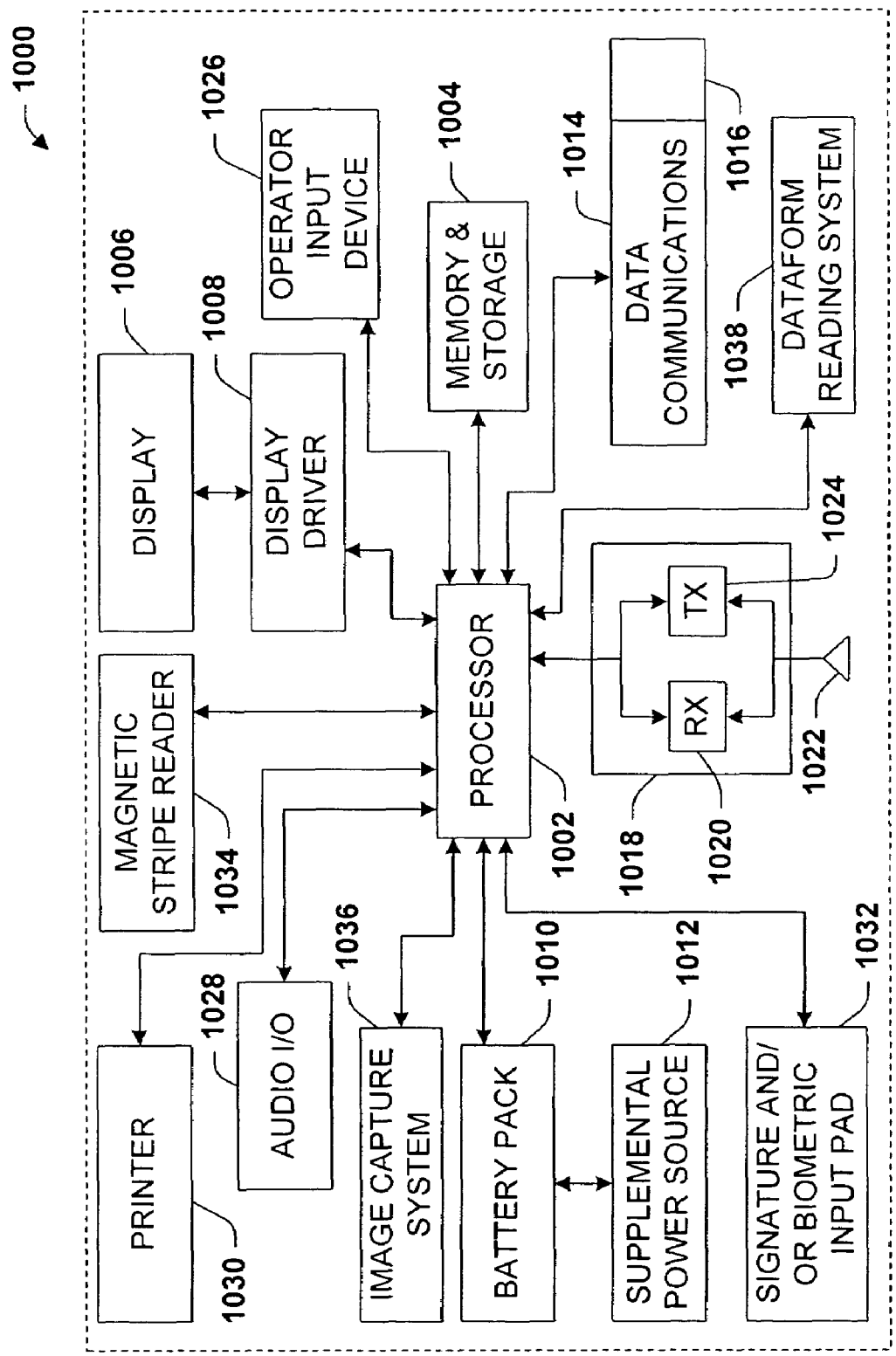
FIG. 10 illustrates a schematic block diagram of a portable hand-held terminal device according to one aspect of the present invention.

Referring now to FIG. 10, there is illustrated a schematic block diagram of a portable hand-held terminal device 1000 according to one aspect of the present invention, in which a processor 1002 is responsible for controlling the general operation of the device 1000. The processor 1002 is programmed to control and operate the various components within the device 1000 in order to carry out the various functions described herein. The processor 1002 may be any of a plurality of suitable processors. The manner in which the processor 1002 can be programmed to carry out the functions relating to the present invention will be readily apparent to those having ordinary skill in the art based on the description provided herein.

A memory 1004 connected to the processor 1002 serves to store program code executed by the processor 1002, and also serves as a storage means for storing information such as receipt transaction information and the like. The memory 1004 may be a non-volatile memory suitably adapted to store at least a complete set of the information that is displayed. Thus the memory 1004 may include a RAM memory for high-speed access by the processor 1002 and/or a mass storage memory, e.g., a micro drive capable of storing gigabytes of data that comprises text, images, audio, and video content. According to one aspect, the memory 1004 has sufficient storage capacity to store multiple sets of information, and the processor 1002 could include a program for alternating or cycling between various sets of display information.

A display 1006 is coupled to the processor 1002 via a display driver system 1008. The display 1006 may be a color liquid crystal display (LCD) or the like. In this example, the display 1006 is a ¼ VGA display with sixteen levels of gray scale. The display 1006 functions to present data, graphics, or other information content. For example, the display 1006 may display a set of customer information, which is displayed to the operator and may be transmitted over a system backbone (not shown). Additionally, the display 1006 may display a variety of functions that control the execution of the device 1000. The display 1006 is capable of displaying both alphanumeric and graphical characters.

Power is provided to the processor 1002 and other components forming the hand-held device 1000 by an onboard battery system 1010. In the event that the battery system 1010 fails or becomes disconnected from the device 1000, a supplemental power source 1012 can be employed to provide power to the processor 1002 and to charge the battery system 1010. The processor 1002 of the mobile device 1000 induces a sleep mode to reduce the current draw upon detection of an anticipated battery failure.

The mobile terminal 1000 includes a communication subsystem 1014 that includes a data communication port 1016, which is employed to interface the processor 1002 with a remote computer. The port 1016 includes at least the USB and IEEE 1394 serial communications capabilities described hereinabove. Other technologies may also be included, for example, infrared communication utilizing an IrDA port.

The mobile device 1000 also includes an RF transceiver section 1018 in operative communication with the processor 1002. The RF section 1018 includes an RF receiver 1020, which receives RF signals from a remote device via an antenna 1022 and demodulates the signal to obtain digital information modulated therein. The RF section 1018 also includes an RF transmitter 1024 for transmitting information to a remote device, for example, in response to manual user input via a user input device 1026 (e.g., a keypad) or automatically in response to the completion of a transaction or other predetermined and programmed criteria. The transceiver section 1018 facilitates communication with a transponder system, either passive or active, that is in use with product or item RF tags. The processor 1002 signals (or pulses) the remote transponder system via the transceiver 1018, and detects the return signal in order to read the contents of the tag memory. The RF section 1018 further facilitates telephone communications using the device 1000. In furtherance thereof, an audio I/O section 1028 is provided as controlled by the processor 1002 to process voice input from a microphone (or similar audio input device) and audio output signals (from a speaker or similar audio output device). In further support thereof, the device 1000 may provide voice recognition capabilities such that when the device 1000 is used simply as a voice recorder, the processor 1002 may facilitate high-speed conversion of the voice signals into text content for local editing and review, and/or later download to a remote system, such as a computer word processor. Similarly, the converted voice signals may be used to control the device 1000 instead of using manual entry via the keypad.

Onboard peripheral devices, such as a printer 1030, signature and/or biometric input pad 1032, and a magnetic strip reader 1034 can also be provided within the housing of the device 1000 or accommodated eternally through one or more of the external port interfaces 1016.

The device 1000 also includes an image capture system 1036 such that the user may take pictures and/or short movies for storage by the device 1000 and presentation by the display 1006. Additionally, a dataform reading system 1038 is included for scanning dataforms associated with articles of commerce. It is to be appreciated that these imaging systems (1036 and 1038) may be a single system capable of performing both functions.

The disclosed architecture in one aspect of real-time location aware mobile commerce provides fast, secure, agent assisted transactions for items that consumers actively seek. Hence, this framework may spawn new types of business models and marketing strategies. Businesses that register with the RPA can compete for the same consumer based on the fact that the demand for a particular item has already been pledged in real-time. For example, standard marketing practices aim to convince potential consumers to purchase a particular product for a particular price. With this proposed framework, the situation reverses whereby retailers will instead target product demand based on specific items on an active shopping list. The RPA will forward the most competitive bids. Therefore, this type of reverse commerce is likely to reduce the overall marketing and advertising costs associated with traditional target marketing practices.

Within this model, retailers match consumer demands through competitive, real-time bids. The consumer need not shop around and haggle for the best prices. Retailers may, therefore, compete for the consumer's business by offering special incentives and loyalty programs. They will try to entice consumers to accept their bid over competing ones, of which they are not aware, but are also within the requested price range. For example, Wal-Mart™ or Home Depot™ may partner with the RPA system and provide access to special promotional databases that they offer only through the RPA service.

The mobility and "always-connected" characteristic of the cPDA establishes an effective framework for real-time competitive bidding to specific groups who wish to engage in this activity. For example, special event tickets may become available at the last minute because some attendees wish to redeem their ticket. With always-on connectivity, the wireless network is ever-present for users—even when network resources are unavailable, and a secure session is suspended. Session resume and transaction recovery ensures that when network resources become available users simply continue communications right from the point of interruption. There is no need to reinitiate the user login process or the interrupted transaction.

The device includes a wireless and wireless update capability to update onboard applications, operating systems, and firmware. Because of the wireless capability, update distributions can be executed at anytime—either automatically when a device is powered on, or on demand, ensuring the capability to update immediately, if required. System and radio card firmware may be updated as well as the operating systems. The device supports at least protocols such as TCP/IP, BOOTP/DHCP (a bootstrap protocol for booting servers from the device), and FTP (File Transfer Protocol).

Many other time sensitive e-commerce opportunities may also become viable because unlike a personal computer, consumers are more likely to carry around their cPDAs within both business and personal settings. One-on-one business opportunities may now become more likely. For example, a neighborhood (with whom consumers do not communicate with very often) may have just posted a used snow blower for sale, which the RPA processes to make available to a subscriber consumer, which is looking for such an item.

Further extensions such as data sharing with other individuals are also likely. For example, when families and friends get together, their cPDA may automatically establish personal area network links (e.g., Bluetooth) and synchronize items on their publicly available wish lists. These are later presented to the user for selection and addition to the personal shopping list. These and many other ideas for direct marketing to specific individuals based on their wish list and budget will evolve. This model also accommodates match making, dating services, and threshold based stock transactions.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An m-commerce system comprising:
a program memory;
a storage device;
a computer processor;
a data input component configured to receive item data representative of an article of commerce;
a coordination component configured to receive a shopping list transmitted by the data input component and presents the article of commerce from the shopping list to a plurality of vendors for a bid, the coordination component further configured to receive the bid for transacting the article of commerce in real-time, and the data input component further configured to provide an alert when the data input component is within physical proximity of the vendor that is presented the bid and has the article in stock;
a location awareness component configured to track the location of the data input component, the vendor presented with the bid is notified when the data input component is within physical proximity of the vendor; and
a payment component configured to facilitate payment of the article of commerce and provides secure communication.

2. The system of claim 1, wherein the system further comprises a wireless portable terminal.

3. The system of claim 1, wherein the data input component is further configured to upload a shopping list to the coordination component.

4. The system of claim 1, wherein the data input component is further configured to download item information from at least one of an appliance and a computer.

5. The system of claim 1, wherein the data input component is is further configured to be in continuous communication with the coordination component.

6. The system of claim 1, wherein the data input component is further configured to communicate information using a virtual private network.

7. The system of claim 1, wherein a user of the data input component specifies a price range for a list of the articles of commerce, in response to which the coordination component is configured to receive one or more of the bids to transact the list.

8. The system of claim 1, wherein the data input component is further configured to locate the article of commerce in a vendor facility via RF backscattering.

9. The system of claim 1, wherein the data input component is configured to facilitate receiving the item data by at least one of manual input, a dataform scanning system, an image capture system, an audio input system, a magnetic reading assembly, and an RF transponder reading assembly.

10. The system of claim 1, wherein the location awareness component includes at least one of a GPS system, a general packet radio services network, and a RTLS architecture.

11. The system of claim 1, wherein the coordination component is further configured to facilitate communication of awareness data to both the data input component and a vendor.

12. The system of claim 11, wherein the awareness data communicated to the data input component provides at least one of notification that the vendor is located nearby, and one of a name and an address of the vendor.

13. The system of claim 11, wherein the awareness data communicated to the vendor provides at least one of identification of the user of the data input component and notification that the data input component is located nearby.

14. The system of claim 11, wherein the awareness data is further configured to facilitate pushing marketing information to the user of the data input component, which marketing information is targeted to the user.

15. The system of claim 1, wherein the coordination component comprises at least one of remotely on a global communication network and a local backoffice network.

16. The system of claim 1, wherein the coordination component is further configured to coordinate inter-component functions between the data input component, the location awareness component, and the payment component.

17. The system of claim 1, wherein the payment component is further configured to provide secure communication using at least one of a biometric, radio frequency identification (RFID) data, and an article-of-commerce dataform.

18. The system of claim 1, wherein the payment component component is further configured to distinguish selection of a first article of commerce from a second article of commerce by processing both RFID data and dataform data of the first article of commerce.

19. The system of claim 1, wherein the payment component is further configured to facilitate secure communication of item data via a secure key cryptographic engine.

20. The system of claim 19, wherein the engine receives as an input at least one of a manufacturer's key, a retailer's key, a unique item ID, and a locate command.

21. The system of claim 19, wherein the engine outputs at least one of a product lookup code and a set/reset password.

22. The system of claim 1, wherein the data input component is further configured to output at least one of a map and location information that indicates the location of the article of commerce in a store.

23. The system of claim 1, wherein the data input component is further configured to receive via the coordination component, item information associated with the article of commerce.

24. The system of claim 1, wherein the coordination component is further configured to retrieve item information associated with the article of commerce from a vendor data resource, and wherein the coordination component is further configured to download the information to the data input component for presentation to the user.

25. The system of claim 1, wherein the coordination component is further configured to manage a transaction between a user of the data input component and a vendor selected to provide the article of commerce.

26. The system of claim 1, wherein the payment component is further configured to facilitate at least one of deactivation and activation of an RFID tag associated with the article of commerce when the data input component reads RFID tag data.

27. The system of claim 1, wherein the payment component is further configured to authenticate the data input component to a store network.

28. The system of claim 1, wherein the location awareness component is further configured to track the data input component in a wide area network and a local area network.

29. The system of claim 1, wherein the payment component is further configured to utilize electronic article surveillance (EAS) technology with bi-stable and resettable EAS data in an RFID tag.

30. The system of claim 1, wherein the location awareness component is further configured to update a vehicle location tracking system to present a location of the vendor offering the bid.

31. The system of claim 1, wherein the location awareness component is further configured to update the data input component with store information of a store as the data input component passes within range of a compatible store communication system.

32. The system of claim 31, wherein the data input component is further configured to notify a user that the article of commerce is present in the store.

33. The system of claim 31, wherein the data input component is further configured to automatically notify a user of a location of the article of commerce in the store.

34. The system of claim 1, wherein the location awareness component is further configured to facilitate synchronization of data of the data input component with a second data input component over a wireless personal data network.

35. The system of claim 1, wherein the coordination component is further configured to download multimedia content related to the article of commerce to the data input component in response to the item data being received.

36. The system of claim 1, wherein the data input component is further configured to transmit a unique password to a tag of the article of commerce to facilitate payment for that article of commerce.

37. The system of claim 36, wherein the tag is an RFID tag that compares the unique password with a password of the RFID tag.

38. The system of claim 36, wherein the tag is at least one of received programmed with the password and programmed with the password at a time of source marking.

39. The system of claim 1, wherein the payment component includes a communication process that is prioritized according to a bandwidth provisioning architecture.

40. The system of claim 1, wherein the data input component is one of a cellular telephone and a connected person data assistant.

* * * * *

UNITED STATES PATENT AND TRADEMARK OFFICE
CERTIFICATE OF CORRECTION

| | | |
|---|---|---|
| PATENT NO. | : 7,668,754 B1 | Page 1 of 1 |
| APPLICATION NO. | : 10/624170 | |
| DATED | : February 23, 2010 | |
| INVENTOR(S) | : Bridgelall | |

It is certified that error appears in the above-identified patent and that said Letters Patent is hereby corrected as shown below:

1. On the Title Page, Item (56), under "OTHER PUBLICATIONS", Lines 11-12, delete "mobile computers/mobile ppr8800 ppc2003.html" and
insert -- mobilecomputers/mobileppr8800ppc2003.html --, therefor.

2. In Column 4, Line 38, delete "datafonms" and insert -- dataforms --, therefor.

3. In Column 10, Line 41, delete "SpeedpassTTM" and insert -- SpeedpassTM --, therefor.

4. In Column 12, Line 66, delete "relailer's" and insert -- retailer's --, therefor.

5. In Column 17, Line 13, delete "datafomm," and insert -- dataform, --, therefor.

IN THE CLAIMS

6. In Column 22, Line 5, in Claim 5, delete "is is" and insert -- is --, therefor.

7. In Column 22, Line 56, in Claim 18, delete "component is" and insert -- is --, therefor.

Signed and Sealed this
First Day of May, 2012

David J. Kappos
*Director of the United States Patent and Trademark Office*